(12) United States Patent
Kanemaru et al.

(10) Patent No.: US 8,187,063 B2
(45) Date of Patent: May 29, 2012

(54) EVAPORATOR FROST PREVENTION CONTROL LOGIC FOR FRONT AND REAR INTEGRATED HVAC SYSTEM

(75) Inventors: Junichi Kanemaru, Upper Arlington, OH (US); Shinji Kakizaki, Dublin, OH (US); Daniel Yelles, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 598 days.

(21) Appl. No.: 12/415,494

(22) Filed: Mar. 31, 2009

(65) Prior Publication Data

US 2010/0248604 A1 Sep. 30, 2010

(51) Int. Cl.
*B60H 1/00* (2006.01)

(52) U.S. Cl. .......................................................... 454/75
(58) Field of Classification Search .................. 454/121, 454/143, 75
See application file for complete search history.

(56) References Cited

U.S. PATENT DOCUMENTS

| | | | | |
|---|---|---|---|---|
| 3,877,243 A | * | 4/1975 | Kramer | 62/180 |
| 4,467,617 A | * | 8/1984 | Morgan et al. | 62/180 |
| 4,653,285 A | * | 3/1987 | Pohl | 62/126 |
| 4,711,295 A | * | 12/1987 | Sakurai | 165/203 |
| 4,724,678 A | * | 2/1988 | Pohl | 62/80 |
| 4,840,040 A | * | 6/1989 | Fung | 62/255 |
| 4,901,788 A | | 2/1990 | Doi | |
| 5,199,485 A | * | 4/1993 | Ito et al. | 165/203 |
| 5,390,728 A | * | 2/1995 | Ban | 165/204 |
| 5,619,862 A | | 4/1997 | Ruger et al. | |
| 6,253,841 B1 | * | 7/2001 | Obara et al. | 165/204 |
| 6,311,763 B1 | * | 11/2001 | Uemura et al. | 165/43 |
| 6,422,309 B2 | * | 7/2002 | Vincent | 165/204 |
| 6,898,946 B2 | | 5/2005 | Ogiso et al. | |
| 6,983,793 B2 | | 1/2006 | Zheng et al. | |
| 7,207,380 B2 | | 4/2007 | Henry et al. | |
| 7,347,056 B2 | * | 3/2008 | Anyoji et al. | 62/133 |
| 7,895,854 B2 | * | 3/2011 | Bash et al. | 62/259.2 |
| 7,997,331 B2 | * | 8/2011 | Oomura et al. | 165/202 |
| 2002/0017383 A1 | * | 2/2002 | Vincent | 165/204 |

(Continued)

FOREIGN PATENT DOCUMENTS

DE 10014203 10/2000

(Continued)

OTHER PUBLICATIONS

European Search Report of European Patent Application No. 10154991.3 dated Apr. 23, 2010.

*Primary Examiner* — Steven B McAllister
*Assistant Examiner* — Jamil Decker
(74) *Attorney, Agent, or Firm* — Rankin Hill Clark LLP

(57) ABSTRACT

An HVAC system for a vehicle includes a housing, a front HVAC unit with a front blower, and rear HVAC unit with a rear blower. The front and rear HVAC units are housed in the housing. The front blower generates an airflow through a front airflow path and the rear blower generates an airflow through a rear airflow path. A separating wall separates the front airflow path from the rear airflow path. The HVAC system further includes an evaporator with a first portion and a second portion. When the rear blower is switched to an OFF position, the rear HVAC unit automatically operates the rear blower at a minimum voltage so as to continue to generate airflow through the second portion of the evaporator.

12 Claims, 5 Drawing Sheets

U.S. PATENT DOCUMENTS

| | | | |
|---|---|---|---|
| 2003/0166389 A1* | 9/2003 | Vincent | 454/121 |
| 2004/0093885 A1 | 5/2004 | Ito et al. | |
| 2004/0148953 A1* | 8/2004 | Kurata et al. | 62/244 |
| 2005/0126774 A1 | 6/2005 | Yamaguchi et al. | |
| 2007/0277539 A1* | 12/2007 | Kim et al. | 62/153 |
| 2008/0032619 A1* | 2/2008 | Voit et al. | 454/158 |
| 2008/0196424 A1 | 8/2008 | Shah et al. | |
| 2008/0248736 A1* | 10/2008 | Aoki et al. | 454/75 |
| 2011/0005734 A1* | 1/2011 | Nanaumi et al. | 165/122 |
| 2011/0009044 A1* | 1/2011 | Seto et al. | 454/143 |

FOREIGN PATENT DOCUMENTS

| | | |
|---|---|---|
| DE | 102007019382 | 10/2007 |
| JP | 05034045 A * | 2/1993 |

* cited by examiner

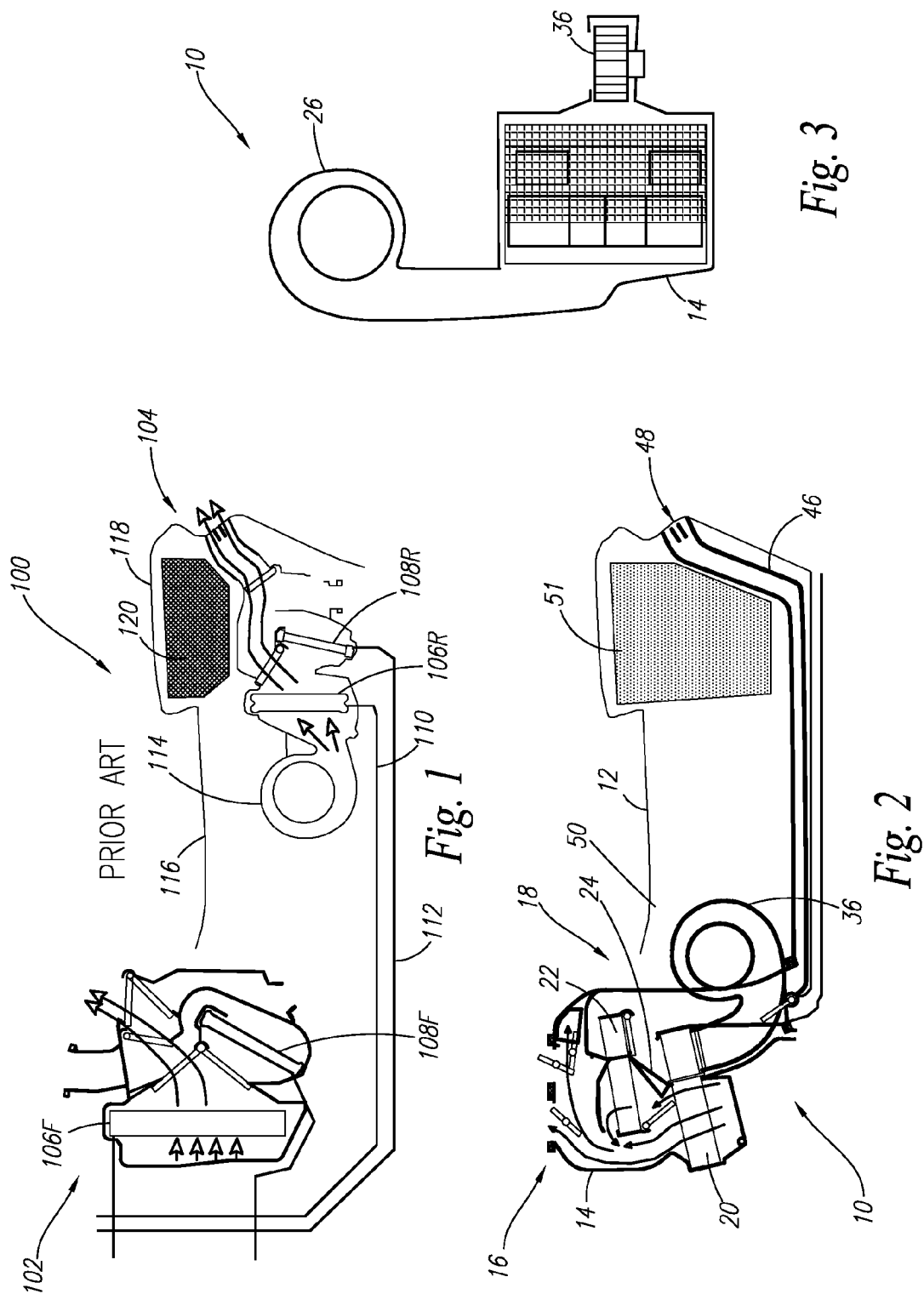

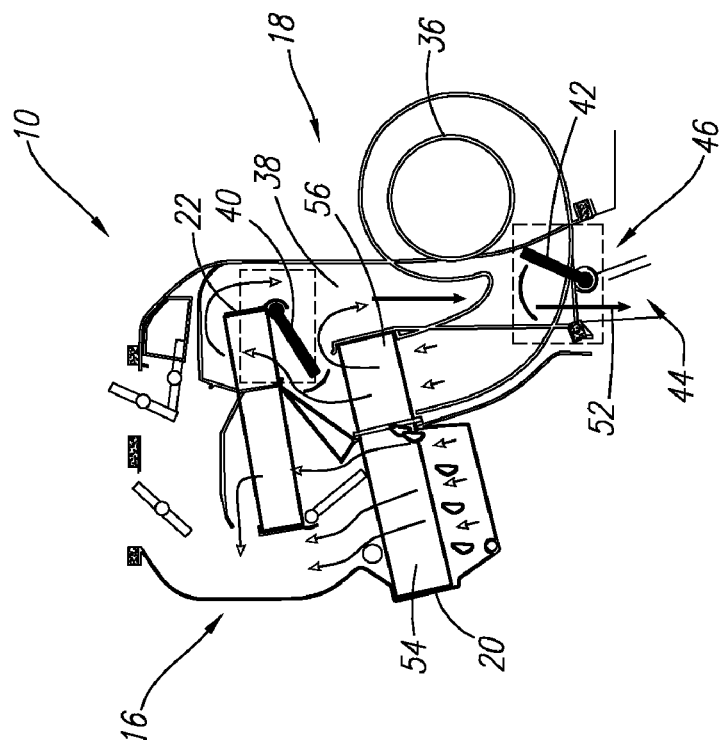
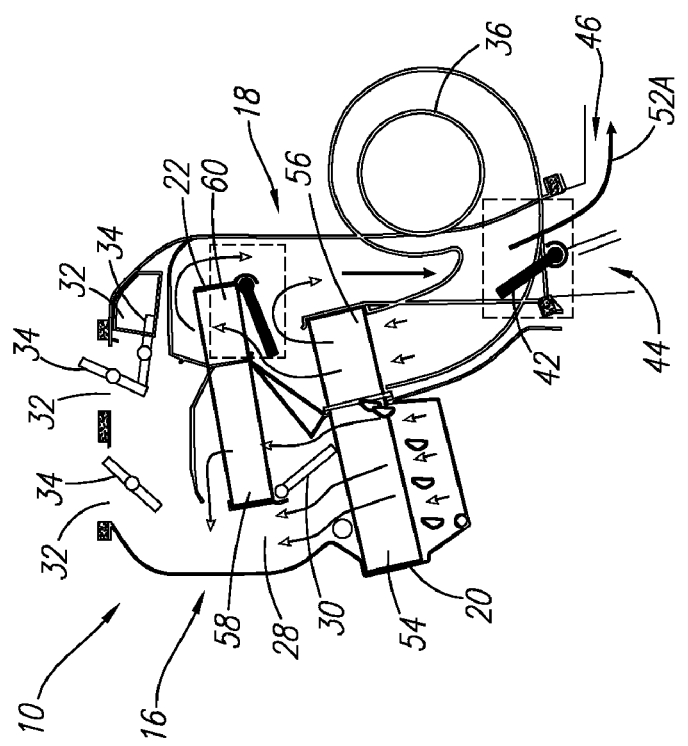
Fig. 4A
Fig. 4B

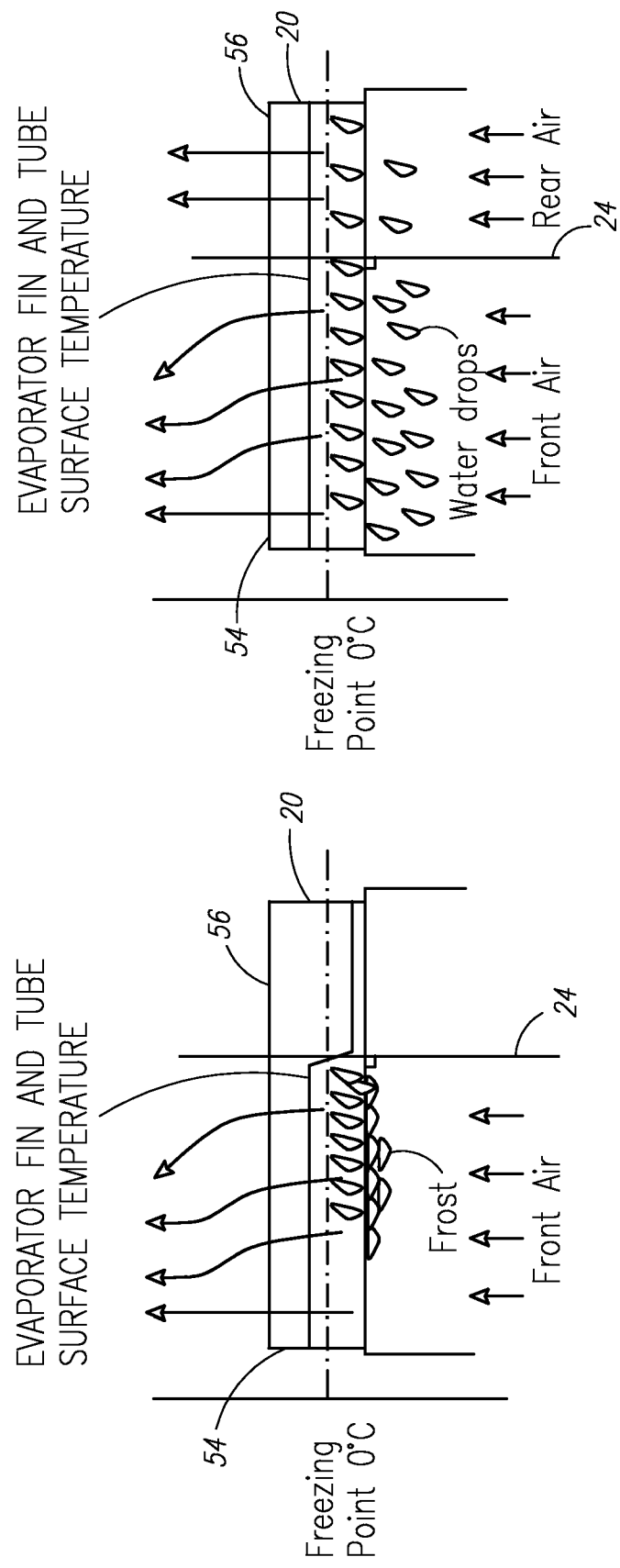

EVAPORATOR FROST PREVENTION CONTROL LOGIC FOR FRONT AND REAR INTEGRATED HVAC SYSTEM

FIELD OF THE INVENTION

The present invention relates to an HVAC system for an automotive vehicle and more specifically to an HVAC system with an integrated evaporator and heating core.

BACKGROUND

As shown in FIG. 1, a conventional dual HVAC system 100 requires two separate HVAC units, a front HVAC unit 102 and a rear HVAC unit 104. Both the front 102 and rear 104 HVAC units are housed in separate housings, and each HVAC unit 102, 104 requires a separate evaporator 106F, 106R and a separate heating core 108F, 108R. Therefore, a major disadvantage to the conventional dual HVAC system 100 is the requirement of two housings, two evaporators, and two heater cores, which increases assembly and manufacturing costs.

Another disadvantage to the conventional dual HVAC system 100 is that the rear HVAC unit 104 requires a longer refrigerant line 110 and heater core line 112. As shown in FIG. 1, the rear HVAC unit 104, which includes a rear blower 114, is located in a center console 116 below an armrest 118. Thus, the rear HVAC unit 104 is located further away from an engine compartment than the front HVAC unit 102, thereby requiring longer refrigerant and heater core lines 110, 112. Longer refrigerant 110 and heater core 112 lines leads to increased material and assembly costs. Further, more joints are required to run the refrigerant and heater core lines 110, 112 from the engine compartment to the rear HVAC unit 104, thereby increasing the probability of fluid leaking at any one joint in each line.

Yet another disadvantage to the conventional HVAC system 100 is that the rear HVAC unit 104 occupies space in the center console 116 that can otherwise be utilized as storage space. As mentioned above, the rear HVAC unit is located in the center console 116 below the arm rest 118. A storage compartment 120 is located below the arm rest 118 and, as clearly show in FIG. 1, the rear HVAC unit 104 is located below the storage compartment 120, thereby limiting the amount of storage space in the center console 116.

Thus, what is required is a dual HVAC system that overcomes the above mentioned disadvantages.

SUMMARY

In accordance with one aspect, the present invention overcomes the above mentioned disadvantages by providing an HVAC system for a vehicle that includes a housing, a front HVAC unit housed in the housing and having a front blower, the front blower generating an airflow through a first airflow path, a rear HVAC unit housed in the housing and having a rear blower, the rear blower generating an airflow through a second airflow path, and an evaporator having a first portion and a second portion, a heating core having a first portion and a second portion, wherein when the rear blower is switched to an OFF position, the rear HVAC unit automatically operates the rear blower at a minimum voltage so as to continue to generate airflow through the second portion of the evaporator.

In accordance with another aspect, the present invention provides an HVAC system, wherein the rear HVAC unit includes a first damper door and wherein when the rear blower is switched to the OFF position the first damper door automatically rotates to a position so as to adjust a temperature of the airflow exiting the rear HVAC unit to match a temperature inside the vehicle.

In accordance with another aspect, the present invention provides an HVAC system, wherein the rear HVAC unit further includes a second damper door and wherein when the rear blower is switched to the OFF position the second damper door automatically rotates to a position to operate the rear HVAC unit in heat mode.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

FIG. 1 is a side schematic view of a conventional dual HVAC system.

FIG. 2 is a side schematic view of an HVAC system according to one exemplary embodiment of the present invention.

FIG. 3 is a top view of the HVAC system of FIG. 2 illustrating the location of a front blower.

FIGS. 4A and 4B are schematic views of the HVAC system of FIG. 2 illustrating airflow patterns.

FIGS. 6A and 6B are graphs illustrating a temperature distribution in an evaporator with and without airflow from a rear blower.

DETAILED DESCRIPTION

Figure 5A:
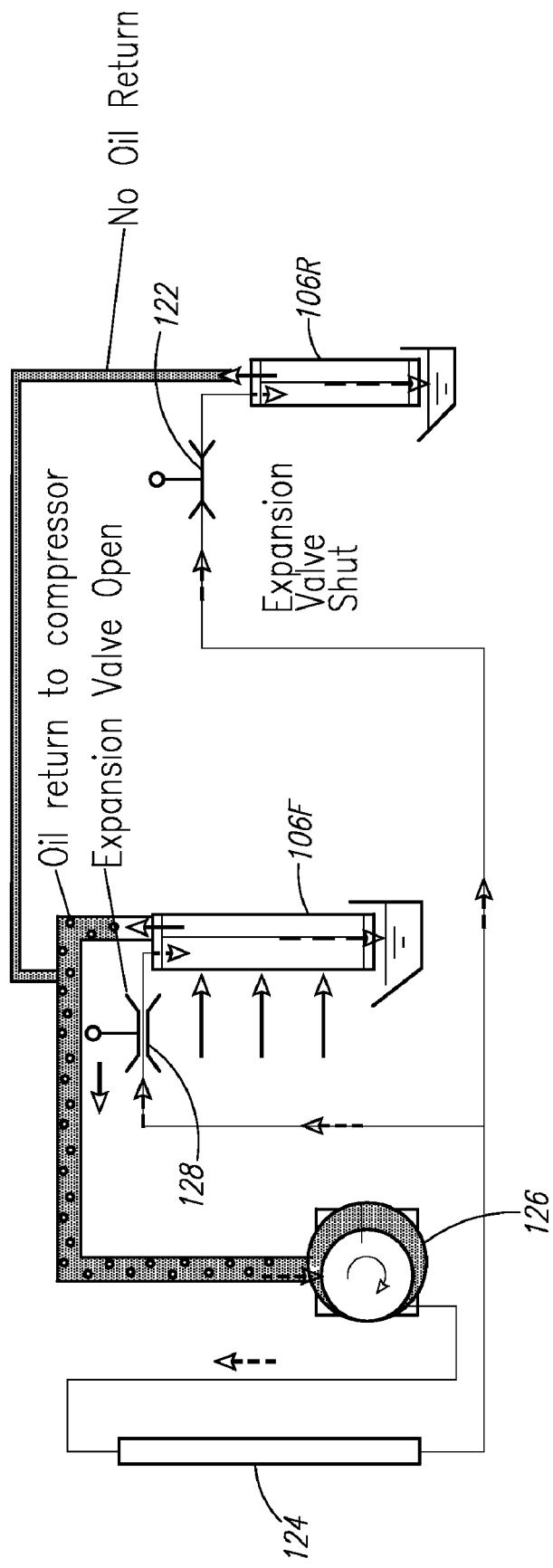
FIG. 5A is a schematic view of oil flow in a conventional HVAC system.

Referring now to the drawings, FIGS. 2 and 3 show a schematic side view and an overhead view respectively of a dual-integrated HVAC system 10 (hereinafter "HVAC system") for an automotive vehicle in accordance with the present invention. The HVAC system is a dual HVAC system in that the HVAC system supplies heating and cooling air to both the front and rear of the vehicle. Further, the HVAC system is an integrated HVAC system in that the HVAC system includes a front HVAC unit and a rear HVAC unit both housed in the same housing, and require only one evaporator and one heating core for both the front and rear HVAC units. It should be noted that the evaporator and heating core of the present invention are larger than the standard evaporator and heating core for the conventional HVAC system described above. Thus, the heating/cooling efficiency and capacity of the dual-integrated HVAC system is not compromised.

Referring to FIGS. 2, 3, 4A and 4B, the HVAC system 10 is located in a dashboard area (not shown) in front of a center console 12 and includes a housing 14, a front HVAC unit 16, a rear HVAC unit 18, an evaporator 20, and a heating core 22. A separating wall 24, located in the housing 14, separates the front HVAC unit 16 from the rear HVAC unit 18. Thus, the airflow through the front HVAC unit 16 is not affected by the airflow through the rear HVAC unit 18 and vice versa.

The front HVAC unit 16 includes a front blower 26, a front (or first) airflow path 28, a mixing door 30, and multiple airflow outlets 32 each having an airflow outlet door 34. The front blower 26 is located in the dashboard area off to the side of the HVAC system 10 behind a glove compartment (not shown), see FIG. 3.

The mixing door 30, which is located between the evaporator 20 and the heating core 22, controls the temperature of the air through the front airflow path 28. Specifically, the mixing door 30 can be rotated to different positions to change the ratio of cold air that flows from the evaporator 20 directly to the front airflow path 28 and from the evaporator 20 through the heating core 22. The airflow from the evaporator 20 through the heating core 22 re-enters the front airflow path 28 and mixes with the cold air from the evaporator 20 to thereby form the correct temperature airflow that will exit through the multiple outlets 32. Thus, the temperature of the airflow through the front airflow path 28 and ultimately out one of the multiple airflow outlets 32 is adjusted by rotating the mixing door 30.

The rear HVAC unit 18 includes a rear blower 36, a rear (or second) airflow path 38, a first damper door 40, a second damper door 42, a rear heater outlet 44, and a rear vent duct 46, which leads to a rear vent outlet 48. The rear blower 36 extends into a front portion 50 of the center console 12, see FIG. 2. Thus, as clearly shown in FIG. 2, the rear HVAC unit 18 does not take up significant space in the center console 12 thereby leaving a larger storage compartment 51 for the occupants.

Referring to FIGS. 4A and 4B, the first damper door 40, which is located between the evaporator 20 and the heating core 22, controls the temperature of the air through the rear airflow path 38 much like the mixing door 30 controls the temperature of the air through the front airflow path 28. Specifically, the first damper door 40 can be rotated to different positions to change the ratio of cold air that flows from the evaporator 20 directly to the rear air flow path 38 and from the evaporator 20 directly through the heating core 22. The air that flows from the evaporator 20 through the heating core 22 re-enters the rear airflow path 38 and mixes with the cold air from the evaporator 20 to thereby form air at the correct temperature that will flow out either the rear heater outlet 44 or the rear vent outlet 48. Thus, the temperature of the air flowing through the rear airflow path 38 and out either the rear heater outlet 44 or the rear vent outlet 48 is adjusted by rotating the first damper door 40.

The second damper door 42 changes a rear operating mode of the rear HVAC unit 18. When the second damper door 42 is in a left position, as shown in FIG. 4A, the rear HVAC unit 18 is in vent mode. When the rear HVAC unit 18 is in vent mode the airflow is directed into the rear vent 46, as indicated by the arrow 52A in FIG. 4A, then through the rear vent duct 46 and out the rear vent outlet 48, see FIG. 2. On the other hand, when the second damper door 42 is in a right position, as shown in FIG. 4B, the rear HVAC unit is in heat mode. When the rear HVAC unit 18 is in heat mode the airflow is directed out the rear heater outlet 44, as indicated by the arrow 52 in FIG. 4B.

As shown in FIGS. 4A and 4B, the airflow in the front airflow path 28 flows through a first portion 54 of the evaporator 20 and the airflow in the rear airflow path 38 flows through a second portion 56 of the evaporator 20. Similarly, the airflow in the front airflow path 28 flows through a first portion 58 of the heating core 22 and the airflow in the rear airflow path 38 flows through a second portion 60 of the heating core 22. Thus, as mentioned above, only one evaporator 20 and one heating core 22 are required for both the front 16 and rear 18 HVAC units. As mentioned above, the evaporator 20 and heating core 22 of the present invention are larger than the standard evaporator and heating core for the conventional HVAC system 100 described above. Therefore, the heating/cooling efficiency and capacity of the dual-integrated HVAC system is not compromised.

A concern in HVAC systems is that the compressor may lock-up when the rear blower 36 is switched to an OFF position. To explain, an explanation of how compressor lock-up is prevented in the conventional HVAC system 100 described above is required.

Referring to FIG. 5A, in the conventional dual HVAC system 100 when the rear blower 114 is in an OFF position no air flows through the rear evaporator 106R. As a result, the temperature of the rear evaporator 106R drops below the freezing point, which causes a rear expansion valve 122 to close. The rear expansion valve 122 regulates the amount of refrigerant that flows from a condenser 124 to the rear evaporator 106R. Thus, when the rear expansion valve 122 is closed refrigerant is prevented from flowing to the rear evaporator 106R. Thus, no oil from the rear evaporator 106R flows back to a compressor 126, which could cause the compressor 126 to lock-up. A design characteristic, however, of the conventional HVAC system 100 is that air is always supplied to the front evaporator 106F. Thus, a front expansion valve 128 remains in an open position to thereby allow refrigerant to flow from the condenser 124 to the front evaporator 106F. As a result, oil continuously flows from the front evaporator 106F to the compressor 126 thereby preventing compressor lock-up.

Figure 5B:
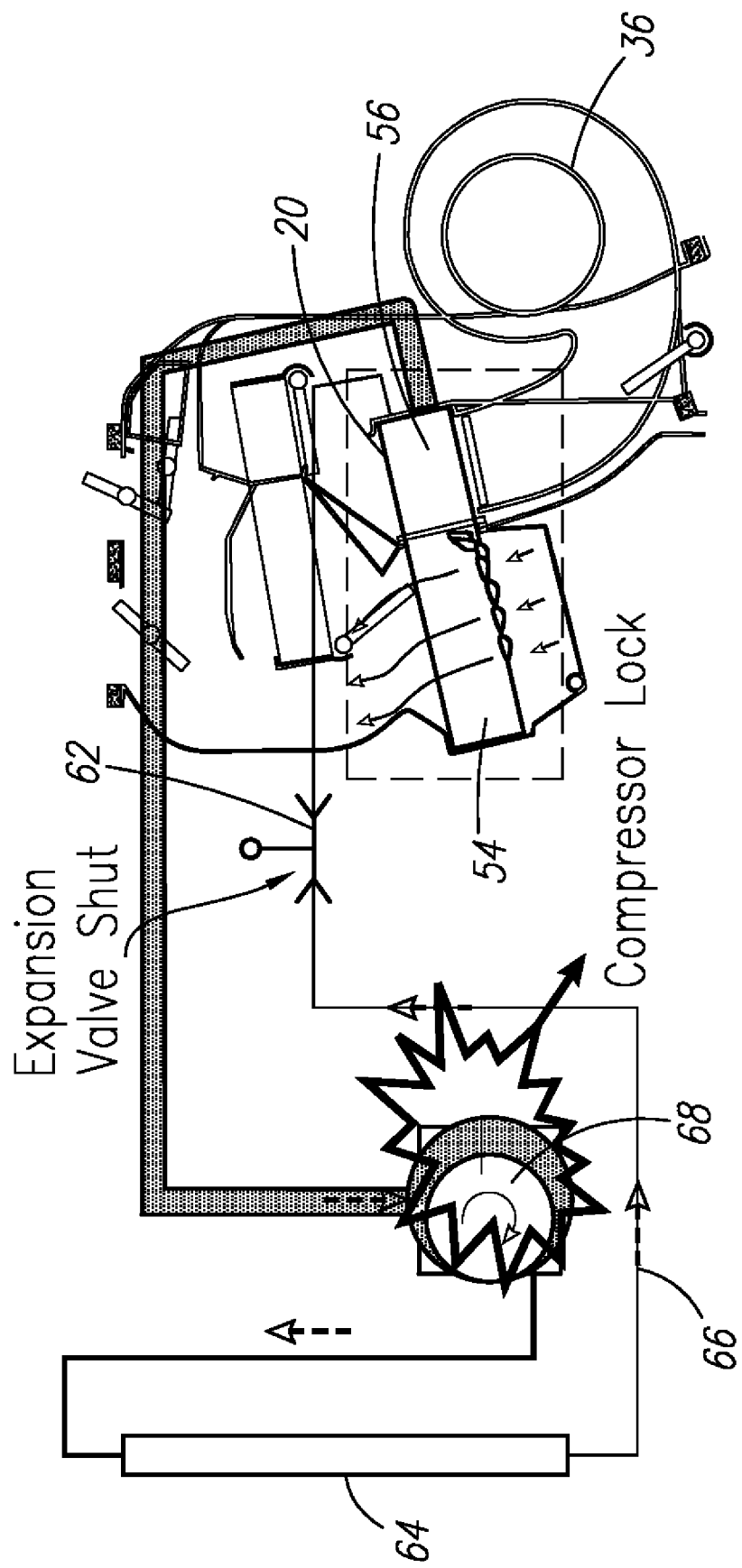
FIG. 5B is a schematic view of oil flow in an HVAC system in accordance with one exemplary embodiment.

The present invention overcomes potential compressor lock-up by operating the rear blower 36 at a minimum voltage when the rear blower 36 is in the OFF position to prevent the evaporator 20 from freezing. Referring to FIGS. 5B, 6A, and 6B, when the rear blower 36 is switched to the OFF position normally no air would flow through the second portion 56 of the evaporator 20, as shown in FIGS. 5B and 6A. As a result, the temperature of the evaporator 20, specifically, the temperature of the evaporator's fin and tube surface across the second portion 56 of the evaporator 20 drops below the freezing point and the condensation of the evaporator freezes, see FIG. 6A. Thus, expansion valve 62 closes thereby preventing refrigerant from flowing from a condenser 64 through a refrigerant line 66 to the evaporator 20. As a result, no oil flows from the evaporator 20 to a compressor 68. Thus, the HVAC system 10 could experience compressor lock-up. It should be noted, however, that the front HVAC unit 16 always supplies air to the first portion 54 of the evaporator 20. Thus, it is possible that the compressor 68 will not lock-up even when the rear blower 36 is in the OFF position.

However, to avoid compressor lock-up, when the occupant of the vehicle switches the rear blower 36 to the OFF position, the rear blower 36 continues to operate at a minimum level. Thus, air continues to flow through the second portion 56 of the evaporator 20. As a result, the temperature of the evaporator's fin and tube surface across the second portion 56 of the evaporator 20 does not drop below the freezing point and the condensation of the evaporator 20 does not freeze, see FIG. 6B. Therefore, the expansion valve 62 remains in an open position to allow refrigerant to flow from the condenser 64, through the refrigerant line 66 and to the evaporator 20, which allows oil to flow from the evaporator 20 to the compressor 68 thereby preventing any possibility of compressor lock-up.

An advantageous feature of the present invention is that when the rear blower 36 continues to operate at the minimum voltage described above when switched to the OFF position is that the occupants are unaware that the rear blower 36 is operating. The present invention accomplishes this in the following two ways.

First, when the rear blower 36 is switched to the OFF position the rear operating mode automatically operates the rear HVAC unit 18 in heat mode. If the rear HVAC unit 18 is in vent mode, the second damper door 42 will automatically rotate, if necessary, to operate the rear HVAC unit 18 in heat mode. For example, if the rear HVAC 18 unit is in vent mode the second damper door 42 will automatically rotate to change the rear HVAC from vent mode to heat mode. In heat mode the air is directed out the rear heater outlet 44, which typically is located near the floor of the passenger compartment and is, thus, undetectable to the occupants.

Second, when the rear blower 36 is switched to the OFF position the first damper door 40 is automatically rotated to adjust the temperature of the airflow from the rear heater outlet 44 to a same temperature inside the passenger compartment or inside temperature T(i). During normal operation of the rear HVAC unit 18 a position (P) of the first damper door 40 is determined by the following equation:

$$P=[T(o)-T(e)]/[T(h)-T(e)]$$

where T(o) is a calculated outlet temperature, T(e) is an evaporator outlet temperature, and T(h) is a heater outlet temperature. When the rear blower 36 is switched to the OFF position the inside temperature T(i) is substituted for the calculated temperature T(o), where the inside temperature T(i) is measured via a temperature sensor. Thus, the equation changes as follows:

$$P=[T(i)-T(e)]/[T(h)-T(e)].$$

Thus, the position P of the first damper door 40 automatically adjusts based on the above equation to keep the temperature inside the vehicle at a constant and, therefore, undetectable to the passengers.

Another advantage to the present invention, as mentioned above, is the larger storage compartment 51, see FIG. 2, in the center console 12.

Still another advantage to the present invention is the reduction in material and assembly costs due to the integration of both the front 16 and rear 18 HVAC units into a single housing, thus, requiring only one evaporator and heating core.

Still yet another advantage to the present invention is the reduction in material and assembly costs due the shorter refrigerant line from the condenser to the rear HVAC unit. The shorter refrigerant line also leads to a reduction in joints required to run the line from the condenser to the evaporator thereby decreasing the number of potential leak areas.

In summary, the present invention has several advantages over the conventional HVAC system, including decreased material costs, decreased assembly costs, reduction in potential leak areas, which leads to less maintenance costs, increased storage capacity just to list a few. In addition, comfort, convenience, and efficiency is not compromised due to the increased size of both the evaporator and heating core, as explained above.

While specific embodiments of the invention have been described and illustrated, it is to be understood that these embodiments are provided by way of example only and that the invention is not to be construed as being limited but only by proper scope of the following claims.

What is claimed is:

1. An HVAC system for a vehicle comprising:
   a housing;
   a front HVAC unit housed in the housing and having a front blower, the front blower generating an airflow through a first airflow path;
   a rear HVAC unit housed in the housing and having a rear blower, the rear blower being independently controllable with respect to the front blower and generating an airflow through a second airflow path;
   an evaporator having a first portion and a second portion; and
   a heating core having a first portion and a second portion, wherein the airflow through the second airflow path flows through the second portion of the evaporator, and the airflow through the first airflow path flows through the first portion of the evaporator; and
   wherein when the rear blower is switched to an OFF position, the rear HVAC unit automatically continuously operates the rear blower at a minimum voltage to thereby continue to generate airflow through the second portion of the evaporator.

2. The HVAC system of claim 1, wherein the rear HVAC unit includes a first damper door and wherein when the rear blower is switched to the OFF position the first damper door automatically rotates to a position so as to adjust a temperature of the airflow exiting the rear HVAC unit to match a temperature inside the vehicle.

3. The HVAC system of claim 2, wherein the rear HVAC unit further includes a second damper door and wherein when the rear blower is switched to the OFF position the second damper door automatically rotates to a position so as to operate the rear HVAC unit in heat mode.

4. The HVAC system of claim 3, wherein the first damper door rotates to different positions to change a ratio of cold air that flows from the second portion of the evaporator directly to the second airflow path and from the second portion of the evaporator through the second portion of the heating core so as to regulate the temperature of the airflow exiting the second airflow path.

5. The HVAC system of claim 4, wherein the front HVAC unit includes a mixing door that rotates to different positions to change the ratio of cold air that flows from the first portion of the evaporator directly to the first airflow path and from the first portion of the evaporator through the first portion of the heating core so as to regulate the temperature of airflow exiting the first airflow path.

6. The HVAC system of claim 1 further comprising a separating wall separating the first airflow path from the second airflow path.

7. An HVAC system for a vehicle comprising:
   a housing;
   a front HVAC unit housed in the housing and having a front blower, the front blower being independently controllable with respect to the front blower and generating an airflow through a front airflow path;
   a rear HVAC unit housed in the housing and having a rear blower, the rear blower generating an airflow through a rear airflow path;
   a separating wall separating the front HVAC unit from the rear HVAC unit;
   an evaporator having a first portion and a second portion; and
   a heating core having a first portion and a second portion, wherein the airflow in the front airflow path flows through the first portion of the evaporator and the airflow in the rear airflow path flows through the second portion of the evaporator, and
   wherein the separating wall prevents the airflow through the first portion of the evaporator from mixing with the airflow through the second portion of the evaporator.

8. The HVAC system of claim 7, wherein when the rear blower is switched to an OFF position, the rear HVAC unit automatically operates the rear blower at a minimum voltage to thereby continue to generate airflow through the second portion of the evaporator.

9. The HVAC system of claim 8, wherein the rear HVAC unit includes a first damper door and wherein when the rear blower is switched to the OFF position the first damper door automatically rotates to a position so as to adjust a temperature of the airflow exiting from the rear HVAC unit to match a temperature inside the vehicle.

10. The HVAC system of claim 9, wherein the rear HVAC unit further includes a second damper door and wherein when the rear blower is switched to the OFF position the second damper door automatically rotates to a position so as to operate the rear HVAC unit in heat mode.

11. The HVAC system of claim 10, wherein the first damper door rotates to different positions to change a ratio of cold air that flows from the second portion of the evaporator directly to the rear airflow path and from the second portion of the evaporator through the second portion of the heating core so as to regulate the temperature of the airflow exiting the rear airflow path.

12. The HVAC system of claim 11, wherein the front HVAC unit includes a mixing door that rotates to different positions to change the ratio of cold air that flows from the first portion of the evaporator directly to the front air flow path and from the first portion of the evaporator through the first portion of the heating core so as to regulate the temperature of airflow exiting the front airflow path.

* * * * *